United States Patent [19]
Jonsson et al.

[11] Patent Number: 6,074,138
[45] Date of Patent: *Jun. 13, 2000

[54] CUTTING-OFF INSERT HAVING A THIN REINFORCED WALL FORMING A CUTTING EDGE

[75] Inventors: Anders Jonsson, Gävle; Pekka Ovaska, Valbo, both of Sweden

[73] Assignee: Sandvik Aktiebolag, Sandviken, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,124
[22] PCT Filed: Nov. 3, 1995
[86] PCT No.: PCT/SE95/01298
§ 371 Date: Aug. 7, 1997
§ 102(e) Date: Aug. 7, 1997
[87] PCT Pub. No.: WO96/14181
PCT Pub. Date: May 17, 1996

[30] Foreign Application Priority Data

Nov. 8, 1994 [SE] Sweden ................... 9403817

[51] Int. Cl.⁷ .................................................. B23B 27/16
[52] U.S. Cl. ............................. 407/117; 407/119; 407/120
[58] Field of Search ..................... 407/117, 116, 407/115, 114, 120, 118, 119

[56] References Cited

U.S. PATENT DOCUMENTS

| | | | |
|---|---|---|---|
| 1,769,222 | 7/1930 | Ignatieff | 407/116 X |
| 2,688,791 | 9/1954 | Luers et al. | 407/115 |
| 3,760,474 | 9/1973 | Stein . | |
| 3,938,230 | 2/1976 | Rice . | |
| 4,801,224 | 1/1989 | Pettersson et al. . | |
| 4,969,779 | 11/1990 | Barten . | |
| 4,992,008 | 2/1991 | Pano . | |
| 5,004,380 | 4/1991 | Hessman et al. . | |
| 5,032,050 | 7/1991 | Niebauer et al. | 407/117 X |
| 5,088,862 | 2/1992 | Niebauer et al. . | |
| 5,330,296 | 7/1994 | Beeghly | 407/119 X |
| 5,333,520 | 8/1994 | Fischer et al. | 407/119 X |
| 5,411,354 | 5/1995 | Gustafsson | 407/117 X |
| 5,529,440 | 6/1996 | Schmidt . | |

FOREIGN PATENT DOCUMENTS

| | | | |
|---|---|---|---|
| 118935 | 9/1944 | Australia | 407/117 |
| 2 435 337 | 4/1980 | France . | |
| 33 47 543 | 11/1984 | Germany . | |
| 36 17 199 | 11/1987 | Germany . | |
| WO95/03908 | 2/1995 | WIPO . | |

*Primary Examiner*—Andrea L. Pitts
*Assistant Examiner*—Henry W. H. Tsai
*Attorney, Agent, or Firm*—Burns, Doane, Swecker & Mathis, L.L.P.

[57] ABSTRACT

A cutting insert adapted for cutting-off and grooving operations comprises a body adapted to be mounted in a holder, the body including a pair of side surfaces spaced apart to define a thickness of the body. The body further includes a bottom surface, a rear surface, a top surface and a front surface each extending transversely from one of the side surfaces to the other side surface. A wall is oriented substantially parallel to the side surfaces and is situated midway therebetween. The wall includes a pair of side faces spaced by equal distance from respective ones of the side surfaces, a front side extending upwardly from the front surface, and a top side extending forwardly from the top surface. The front and top sides intersect one another to define a cutting edge formed of the same material as the front and top sides. The front side extends upwardly substantially to the level of the top surface, and the top side extends forwardly from the top surface to a point in general vertical alignment with the front surface. The bottom surface includes a bottom groove formed therein extending from the front surface to the rear surface. The bottom groove is spaced downwardly from the wall. The top surface includes a top groove extending from the rear surface and stopping short of the wall.

8 Claims, 4 Drawing Sheets

6,074,138

CUTTING-OFF INSERT HAVING A THIN REINFORCED WALL FORMING A CUTTING EDGE

BACKGROUND OF THE INVENTION

The present invention relates to a cutting insert primarily for cutting-off operations. However, if so desired, it may also be used for grooving. Suitably, the insert is made of coated or uncoated cemented carbide, but other hard materials may also be used, such as different ceramic materials and so called cermets.

Cutting-off and deep radial and axial grooving are performed with tools which are normally referred to as parting and grooving tools. Characteristic for inserts and tools of this type is their small axial extension. The reason for this is of course that material for making the tools shall not be unnecessarily wasted, and also to make possible the machining of grooves of a smaller width.

A typical insert for cutting-off is disclosed in Pettersson et al. U.S. Pat. No. 4,801,224. However, for some cutting-off operations, also this insert is too wide, because too much material from the workpiece is wasted in the form of chips. The inserts according to this citation are made with a smallest width of 2 mm, since even smaller insert widths are not considered to be safely fastenable to a holder. Moreover, the inserts become too fragile.

Another cutting insert for cutting-off and grooving is disclosed in Schmidt U.S. Pat. No. 5,529,440. This one has a relatively thin, quadrangular basic shape, with a cutting edge provided in each corner. However, the relation between the insert's extension and thickness is too large to make it tenable. Therefore, it is usually made of high speed steel instead of cemented carbide, which of course results in a considerable deterioration in the cutting performance.

Thus, a first object of the present invention is to construct a cutting insert primarily intended for cutting-off, which makes possible very small cutting widths, for instance down to 0.4 mm.

A second object of the present invention is to provide a cutting-off insert that is as thin as possible but also as strong as possible.

Still another object of the present invention is to provide a cutting-off insert that is as thin as possible and does not make necessary any changes of the other equipment, such as for instance the holder blade.

SUMMARY OF THE INVENTION

These and other objects have been achieved in a surprising way by a cutting insert formed of a hard material and adapted for cutting-off and grooving operations. The insert comprises a holding part and a cutting part projecting from the holding part along an axis. The holding part, which is adapted to mount the insert in a holder, includes top and lower sides. The cutting part includes a reinforcing portion, and a wall extending from the reinforcing portion. The reinforcing portion has a first thickness extending in a direction oriented perpendicular to the axis, and a lower side extending from the lower side of the holding part. The wall extends from the reinforcing portion in a direction away from the lower side of the reinforcing portion. The wall has a second thickness extending in a direction oriented perpendicular to the axis. The second thickness is less than the first thickness. The wall includes a top side and an end surface intersecting one another to form a cutting edge.

Preferably, the second width is from ⅙ to ⅔ of the first width.

BRIEF DESCRIPTION OF THE DRAWING

For illustrative but non-limiting purposes, the invention will now be further described with reference to the appended drawings. These are herewith presented.

DETAILED DESCRIPTION OF PREFERRED EMBODIMENTS OF THE INVENTION

Figure 3:
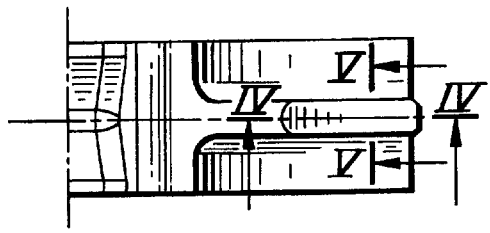
FIG. 3 shows a partial view of the cutting insert of FIG. 1 straight from above.
Figure 4:
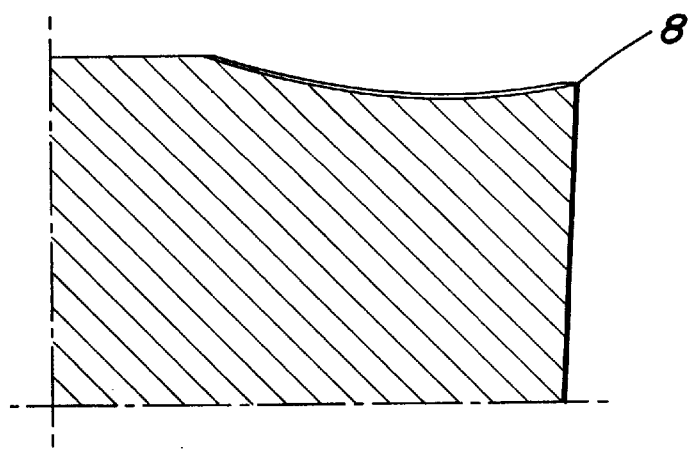
FIG. 4 shows the section IV—IV in FIG. 3.

The cutting insert according to the invention is generally designated by reference numeral 1. It comprises a holding part or shaft 2 and a cutting part 2A which projects from the holding part 2 along an axis A (see FIG. 3). The holding part can be introduced into and clamped in a corresponding recess in a holder as described in the above mentioned U.S. Pat. No. 4,801,224, hereby incorporated by this reference. In order to guarantee a stable fastening, the top side of the shaft 2 and the whole lower side of the cutting insert are shaped as two longitudinal grooves or recesses 3 and 4, respectively. The upper groove 3 is terminated by a portion 3', which is either substantially parallel to the groove 4 on the lower side, or forms a very small angle to said groove, the imaginary projections of the groove 3' and the groove 4 intersecting at a point in front of the front side or front surface 5 of the insert. The insert is pressed into the holder till the upper clamping lever of the latter abuts against an abutment surface 6 on the upper side of the cutting insert.

Figure 1:
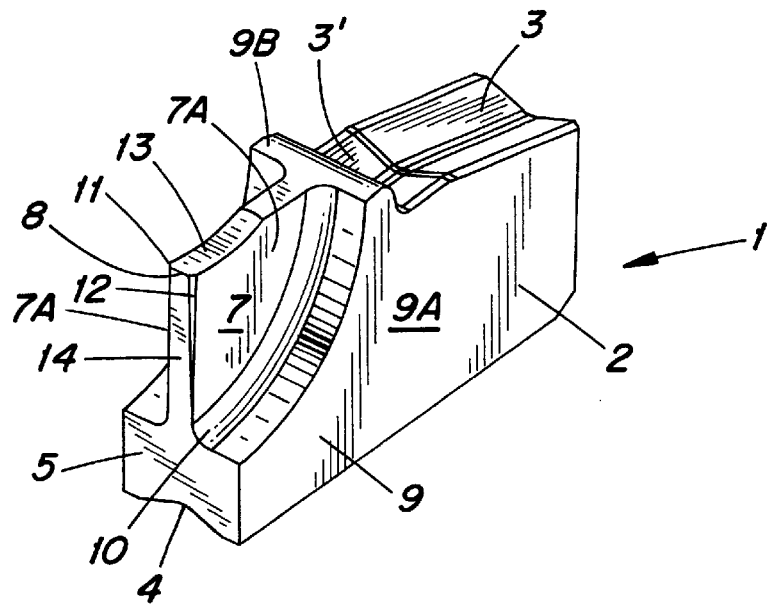
FIG. 1 shows a cutting insert according to the invention in a perspective view.
Figure 2:
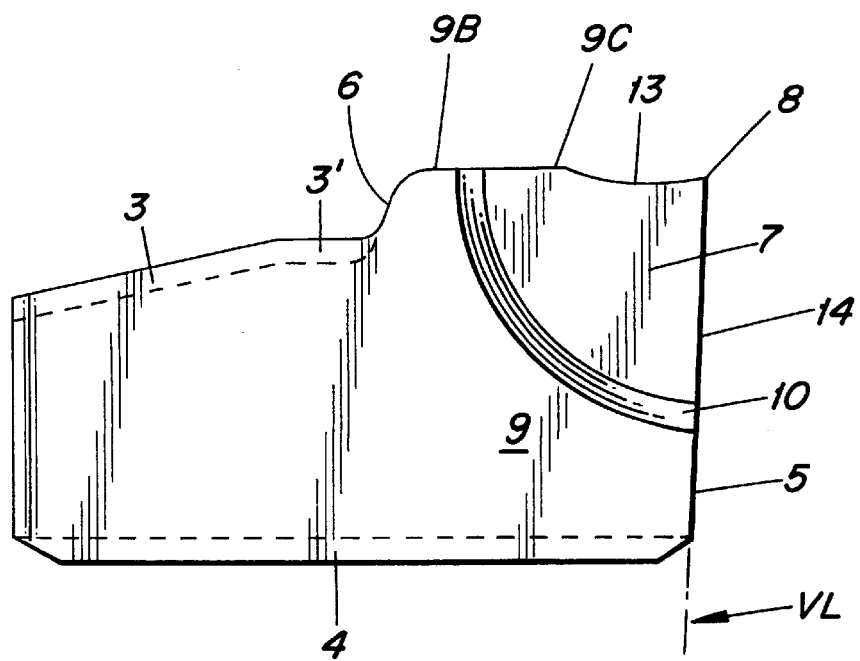
FIG. 2 shows the insert according to FIG. 1 in a side view.

An essential feature of the present invention is the thin wall 7, which according to FIGS. 1 and 2 is substantially formed as a sector of a circle and substantially vertically. In order to reduce the produced groove width in the rotating workpiece to a minimum, the wall 7 has been made as thin as possible. Thus, the wall 7 suitably has a thickness T in a direction perpendicular to the axis A which is from 0.3 to 1.5 preferably from 0.4 to 1.2 mm and in particular from 0.5 to 1.0 mm.

Another essential feature of the present invention is that the wall 7 is supported by a considerably thicker reinforcing part 9, whose width substantially corresponds to the thickness of the insert. The whole attachment of wall 7 is accomplished along the reinforcing part 9, preferably via a reinforcing radius transition 10. The thickness $T_1$ of wall 7 suitably amounts to between ⅙ and ⅔ of the thickness T of the reinforcing part, preferably between ⅕ and ½, and in particular between ⅕ and ⅓. The reinforcing part extends substantially to a vertical line VL that intersects the cutting edge or at least to a plane that forms maximally 10°, preferably 7°, to said vertical line. It should be pointed out that these values are specific for the cutting insert and do not imply the functional values, when the insert is placed into a holder.

Figure 5:
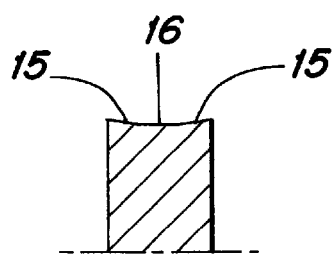
FIG. 5 shows the section V—V in FIG. 3.

A cutting edge 8 is formed by the intersection of top side and end surface 14 of the wall. Suitably, the cutting edge 8 may be wholly straight or include two short, oblique corner cutting edges 11, below which extend tapering reinforcing chamfers 12. In order to break the created chips and to give a more light-cutting geometry, the rake surface or top side 9C of the wall 7 has been formed with a chip-breaking depression or recess 13. This recess begins immediately behind the cutting edge 8 according to the illustrated embodiment, without intersecting the cutting edge. However, within the frame-work of the invention, the recess 13 may also intersect the cutting edge. The cross-section of the recess may be seen in FIG. 5. Thus, the recess may for instance have a trapezoid-shaped cross-section, comprising two longitudinal, substantially planar side surfaces 15 and a bottom surface 16 which is substantially horizontal and placed centrally between said surfaces 15. The cross-section of recess 13 may also be shaped as a circle segment, the cross-section of its bottom thus describing a radius.

In order to give sufficient clearance, the wall 7 may be shaped in a special way. Thus, the front surface 14 of the wall 7 may be angled somewhat forwardly relative to the vertical line VL, which can be most clearly seen in FIG. 3. The front end surface 5 of the reinforcing part possibly lies in the same inclined plane as the front 14 end surface of the wall, or the surface 5 may be wholly vertical. Further, the wall 7 can suitably taper somewhat with an increasing distance from the cutting edge 8, in order to give a certain clearance relative to the walls in the produced groove in the workpiece. Thus, the side surfaces of wall 7 may be inclined by for instance 0.3 to 3° relative to the vertical line in the vertical direction and by about equally much relative to a vertical plane in the longitudinal direction of the cutting insert.

Thus, it will be appreciated from the above discussion that the body of the insert includes a pair of side surfaces 2A spaced apart to define a thickness. The body also comprises the front surface 5 and a top surface 9B. Each of those surfaces 5, 9B extends transversely from one side surface 9B to the other. The wall 7 is oriented substantially parallel to the side surfaces and is situated midway therebetween. The side faces 7A, 7A of the wall are spaced by equal distances from respective side surfaces 9A. The front side 14 of the wall extends upwardly from the front surface 5 substantially to the level of the top surface 9B, and the top side 9C of the wall extends forwardly from the top surface 9B to a point in substantial vertical alignment with the front surface 5 (see FIG. 2).

Figure 6:
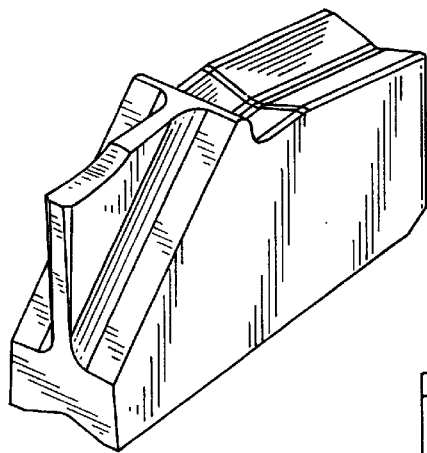
FIG. 6 shows another embodiment of a cutting insert according to the present invention in a perspective view.
Figure 7:
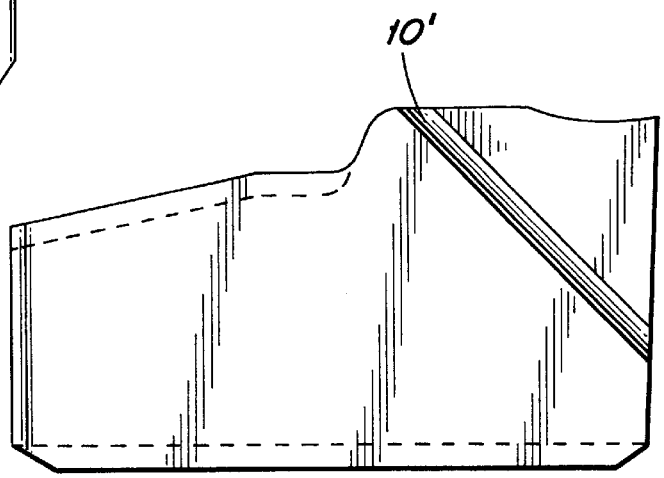
FIG. 7 shows the cutting insert of FIG. 6 in a side view.

The embodiment according to FIGS. 1 and 2 are preferred since the basically quarter-circle-shaped wall 7 gives the smallest possible free over-hang for the cutting edge 8 in all wall-supporting directions, which of course gives a strong and stable wall 7. However, if so desired, for instance because of production-technical reasons, the wall 7' may also be shaped according as illustrated in FIG. 6 and 7, with a substantially straight transition 10 between wall 7' and reinforcing part 9', said transition suitably being shaped as a reinforcing radius transition 10'. The transition is angled to the bottom side of the cutting insert N by about 30 to 60°, preferably by 40 to 50°. Otherwise, the cutting insert is shaped analogously to the insert as illustrated in FIGS. 1 and 2.

Figure 8:
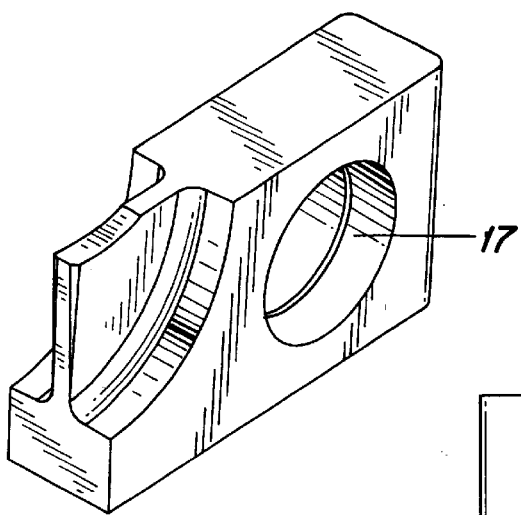
FIG. 8 shows a further embodiment of the cutting insert according to the present invention.
Figure 9:
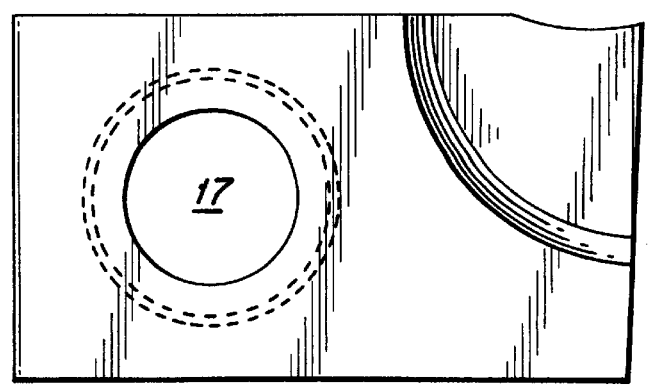
FIG. 9 shows the cutting insert according to FIG. 8 in a side view.

As mentioned above, the cutting insert shown in FIGS. 1, 2, 6 and 7 may be fastened onto a holder as shown in U.S. Pat. No. 4,801,224. However, the combination that is essential for the invention of a thin cutting edge-carrying wall and a supporting part may also be fastened in a number of other possible ways. Thus, an insert 1 as shown in FIGS. 8 and 9, may be fastened by means of a locking arrangement, such as a locking screw, a locking pin or a levering clamp, which is inserted into a through hole 17 in the holding part 2 of the insert.

The thin wall 7 may be produced in at least three different ways: either the whole insert as depicted may be directly pressed, or material can be taken away from both sides of the wall in order to form the either before or after the sintering.

Figure 10:
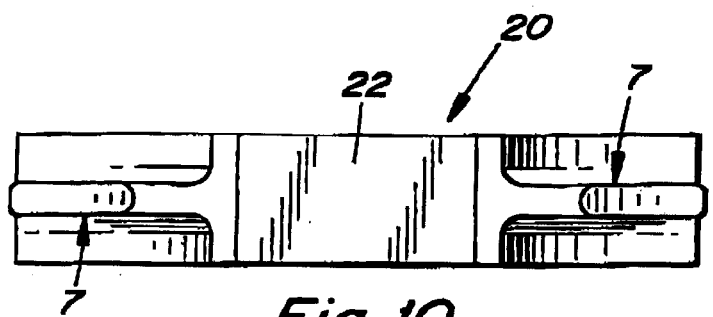
FIGS. 10 and 11 show top plan views of two oblong embodiments, respectively, of the invention.
Figure 11:
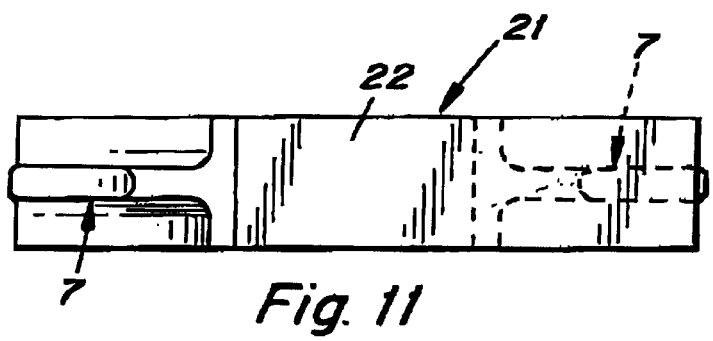
Figure 12:
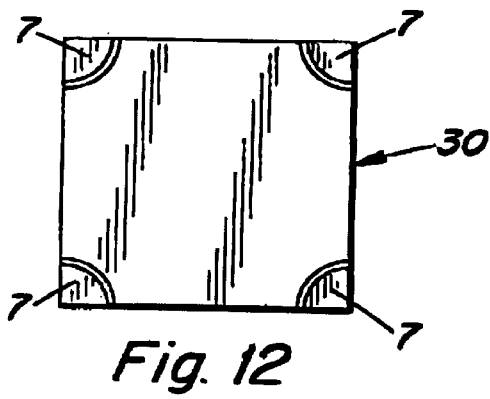
FIG. 12 is a plan view of a square embodiment of the invention.
Figure 13:
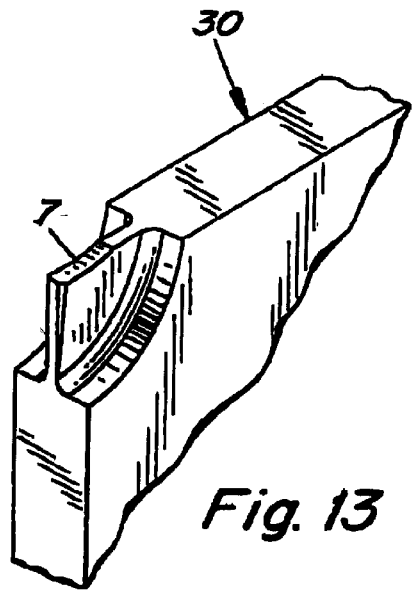
FIG. 13 is a fragmentary perspective view of a corner of the insert depicted in FIG. 12.
Figure 14:
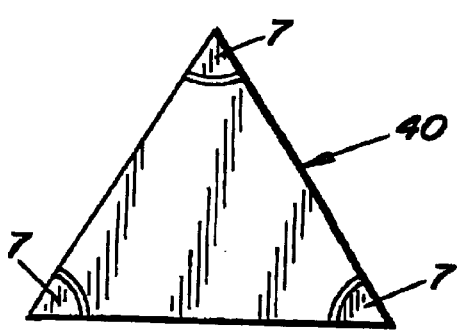
FIG. 14 is a plan view of a triangular embodiment of the invention.

The above described cutting inserts do only comprise one cutting edge. However, within the framework of the present invention, cutting inserts are feasible with several thin, reinforced cutting edges, analogously with inserts as disclosed in, e.g., Barten U.S. Pat. No. 4,969,779, Pano U.S. Pat. No. 4,992,008 and Hessman et al. U.S. Pat. No. 5,004,380. Thus, according to the present invention, cutting edge-carrying, reinforced walls 7 in accordance with the present invention may be formed at both ends of an oblong cutting-off or grooving insert 20 (FIG. 10) or 21 (FIG. 11), the two cutting edges either being provided on the same side, i.e., adjacent to the top side, or at different sides, diagonally opposed to each other (FIG. 11). In both cases, the intermediate portion 22 functions as a holding part or a shaft. Further, analogously with SE-B-450 350, a cutting insert 30 of a polygonal basic shape (FIGS. 12–13), suitably a square basic shape, may be provided with a thin cutting edge-carrying wall part 7 at each operative cutting corner. Cutting inserts 40 of a triangular basic shape are also feasible (see FIG. 14).

By the cutting insert according to the invention, a number of important advantages have been achieved. Thus, for instance by a cutting insert according to FIG. 1, which gave a groove width of 0.8 mm, it was managed to cut off a roll bearing blank with a diameter of 8 mm at a feed of 0.2 mm/rev., a large number of times before causing any pronounced wear of the cutting edge.

We claim:

1. A cutting insert formed of a hard material and adapted for cutting-off and grooving operations, the insert comprising a body adapted to be mounted in a holder, the body including a pair of side surfaces spaced apart to define a thickness of the body, the body further including a bottom surface, a rear surface, a top surface and a front surface each extending transversely from one of the side surfaces to the other side surface, and a one-piece wall oriented substantially parallel to the side surfaces and situated midway therebetween, the wall including a pair of side faces spaced by equal distance from respective ones of the side surfaces, the wall including a front side extending upwardly from the front surface, and a top side extending forwardly from the top surface, the front side and top side intersecting one another to define a cutting edge formed of the same material as the front and top sides, the front side extending upwardly substantially to the level of the top surface, and the top side extending forwardly from the top surface to a point in general vertical alignment with the front surface, the bottom surface including a bottom groove formed therein and extending from the front surface to the rear surface, the bottom groove spaced downwardly from the wall, the top surface including a top groove extending from the rear surface and stopping short of the wall.

2. The cutting insert according to claim 1 wherein a thickness of the wall is from 1/6 to 2/3 of the thickness of the body.

3. The cutting insert according to claim 1 wherein each side face of the wall has an edge situated opposite the top side, each edge joined to the body by a concavely curved transition portion.

4. The cutting insert according to claim 1 wherein the top side of the wall is formed with a chipbreaking recess.

5. The cutting insert according to claim 1 wherein the body has opposite ends, said wall being situated at one of said ends, and there being another, identically shaped wall situated at the other end, whereby the insert is reversible.

6. The cutting insert according to claim 1 wherein the body forms at least three corners, said wall situated at one of said corners, and there being additional identically shaped walls at respective ones of the remaining corners, whereby the insert is indexible.

7. The cutting insert according to claim 1 wherein the body is formed of cemented carbide.

8. The cutting insert according to claim 1 wherein the body is formed of a ceramic material.

* * * * *